Dec. 13, 1938.　　J. G. FORD ET AL　　2,139,947

DIELECTRIC LIQUID FOR ELECTRICAL APPARATUS

Filed March 30, 1937　　4 Sheets-Sheet 1

INVENTORS
James G. Ford and
Charles F. Hill.
BY
ATTORNEY

Dec. 13, 1938.                    J. G. FORD ET AL                    2,139,947
                    DIELECTRIC LIQUID FOR ELECTRICAL APPARATUS
                        Filed March 30, 1937           4 Sheets-Sheet 3

Fig. 5.
Freezing Point Curves for Mixtures of Tetrachlorethylbenzene Isomers and Pentachlorethylbenzene and Chlorinated Diphenyl Oxides.

Fig. 6.

WITNESSES:

INVENTORS
James G. Ford and
Charles A. Hill.
BY
ATTORNEY

Dec. 13, 1938.     J. G. FORD ET AL     2,139,947
DIELECTRIC LIQUID FOR ELECTRICAL APPARATUS
Filed March 30, 1937     4 Sheets-Sheet 4

Fig. 9.
Pentachlordiphenyl Oxide Isomers with stated Percentages of 70-30 Mixtures of Pentachlorethylbenzene and Tetrachlorethylbenzene Isomers Fig. 10.
Temperature for maximum Power Factor of Mixtures of Tetrachlorethylbenzene Isomers and Pentachlorethylbenzene Mixture and Hexachlordiphenyl Oxide Isomers for 60 Cycle Current.

WITNESSES:

INVENTORS
James G. Ford and
Charles F. Hill
BY
ATTORNEY

Patented Dec. 13, 1938

2,139,947

UNITED STATES PATENT OFFICE 2,139,947

DIELECTRIC LIQUID FOR ELECTRICAL APPARATUS

James G. Ford, Forest Hills, and Charles F. Hill, Edgewood, Pa., assignors to Westinghouse Electric & Manufacturing Company, East Pittsburgh, Pa., a corporation of Pennsylvania Application March 30, 1937, Serial No. 133,924

32 Claims. (Cl. 252—1).

The invention relates to dielectric liquids for electrical apparatus and the insulating of the electrical apparatus, and this application is a continuation-in-part of applications Serial Nos. 53,096 and 53,097.

The object of the invention is to provide a dielectric liquid for electrical apparatus which is chemically stable under ordinary operating conditions, fireproof and which when decomposed, produces incombustible gases.

It is also an object of the invention to provide a dielectric liquid for electrical apparatus which undergoes little physical change through the range of temperatures to which electrical apparatus is normally subjected, thereby enabling its use under all working conditions for such apparatus.

A further object of the invention is to provide for insulating electrical apparatus with a dielectric which on decomposition by a electric arc, generates substantially incombustible gases.

For a fuller understanding of the nature and objects of the invention, reference may be had to the following detailed description, taken in conjunction with the accompanying drawings, in which.

In preparing our dielectric liquid, we employ a base mixture comprising ethyl-tetrachlorbenzene isomers and ethyl-pentachlorbenzene. This mixture may be prepared in a number of ways. For example, by the Friedal-Crafts synthesis, which comprises treating ethylchloride with benzene in the presence of an aluminum chloride catalyzer. The ethylbenzene produced is then chlorinated by bubbling chlorine through it.

Figure 1:
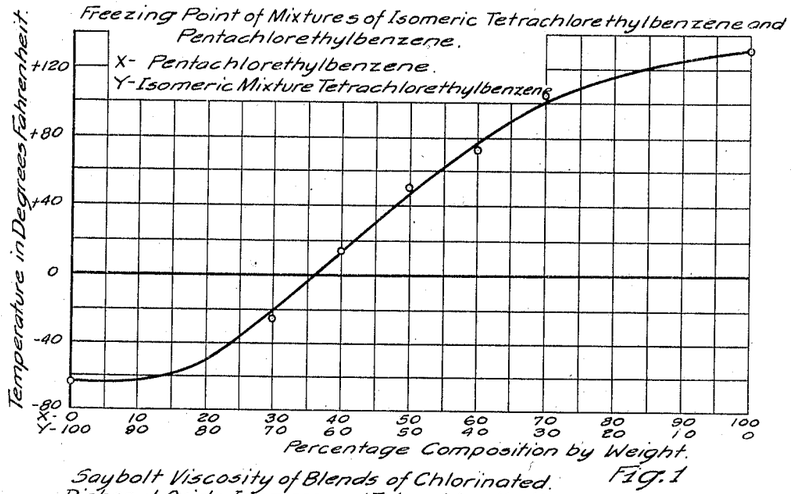
Figure 1 is a graph showing how the freezing point of the base liquid varies as the percentages of ethyl-tetrachlorbenzene isomers and ethyl-pentachlorbenzene are varied.
Figure 2:
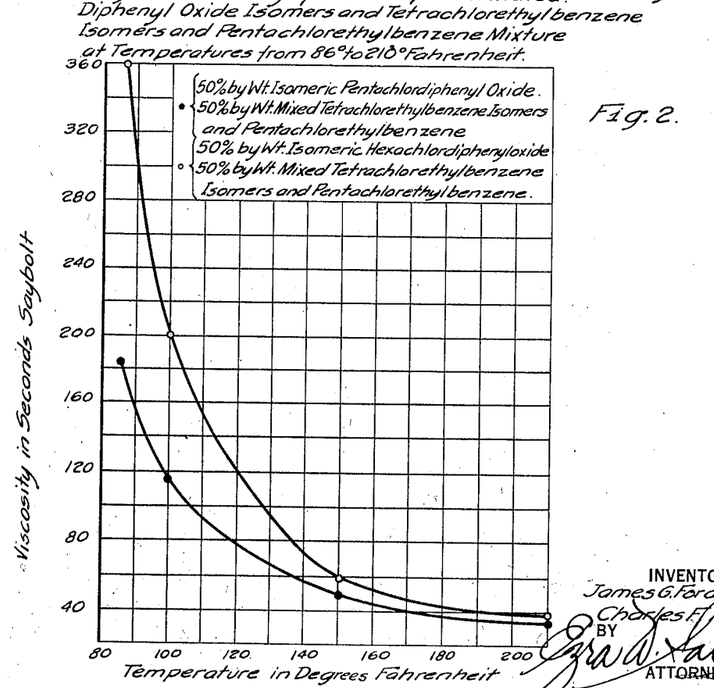
Fig. 2 is a graph showing how the viscosity of mixtures of the dielectric liquid varies with changes in temperature.
Figure 3:
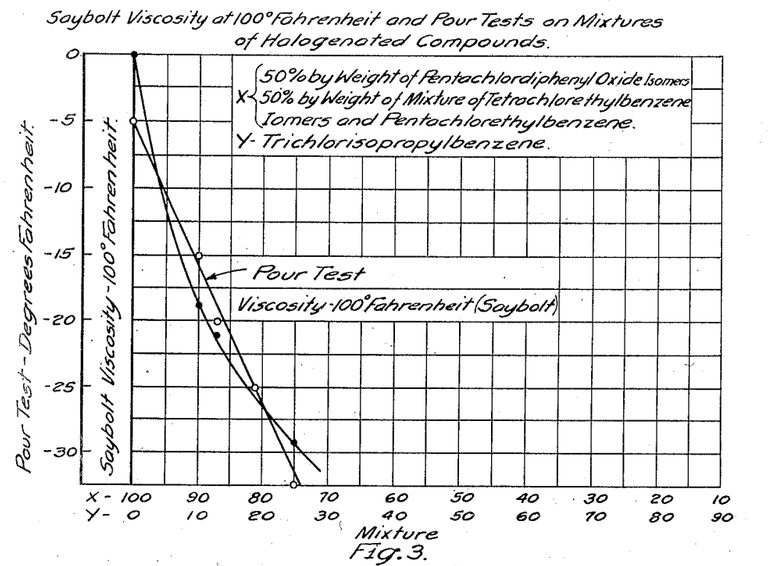
Fig. 3 is a graph showing the effect on freezing point and viscosity of the addition of a freezing point depressor to a mixture of 50% by weight ethyl-tetrachlorbenzene isomers and ethyl-pentachlorbenzene and 50% by weight of an isomeric pentachlordiphenyloxide mixture.
Figure 4:
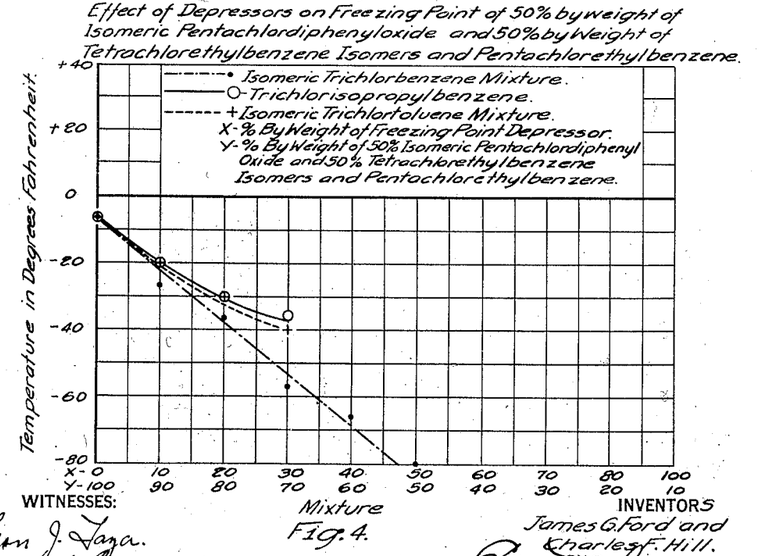
Fig. 4 is a graph showing the effect of introducing freezing point depressors to a mixture of ethyl-tetrachlorbenzene isomers, ethyl-pentachlorbenzene and chlorinated diphenyloxide.

Referring to Fig. 1, it will be noted that as the relative proportion of the isomers of ethyl-tetrachlorbenzene to ethyl-pentachlorbenzene is increased in our base liquid, the freezing point of the mixture decreases. This gives us considerable flexibility in preparing our dielectric from this base material. For instance, if a very low freezing point is required, we may use a base liquid rich in ethyl-tetrachlorbenzene isomers or we may use a base liquid rich in ethyl-pentachlorbenzene and obtain the desired freezing point by the addition of a freezing point depressor to the mixture. The composition of the final liquid would be determined by the other characteristics desired together with production costs.

Ethyl-tetrachlorbenzene isomers and ethyl-pentachlorbenzene both have excellent electrical properties, and it follows that mixtures of the two also have good electrical properties. However, ethyl-pentachlorbenzene has a slightly better power factor than the isomeric mixture of the ethyl-tetrachlorbenzene and in some instances, the higher percentages of ethyl-pentachlorbenzene in the base liquid are preferred. Referring to Fig. 1, it will be noted that the ethyl-pentachlorbenzene freezes at about 125° F. and the isomeric mixture of the ethyl-tetrachlorbenzenes freezes at about −65° F., also that the different mixtures of these materials give intermediate freezing points.

In the interest of manufacturing economy of the liquid dielectric, the base liquid containing 40–80% ethyl-pentachlorbenzene is generally preferred, particularly since the material can generally be handled as a liquid for blending purposes. With the higher percentages of ethyl-pentachlorbenzene present, crystallization of the super-cooled liquid will sometimes take place on standing at ordinary temperature. For this reason, it is oftentimes advantageous to use the base liquid with lower percentages of ethyl-pentachlorbenzene.

In order to lower the freezing point of our base liquid, chlorinated diphenyloxide isomers are employed. This latter compound has good electrical characteristics and when mixed with the base liquid containing 30% ethyl-tetrachlorbenzene isomers and 70% ethyl-pentachlorbenzene in a 70–30 ratio lowers the freezing point from about 100° F. to about −25° F. The boiling point of such a mixture is about 560° F. Therefore, it has a liquid range of −25° F. to +560° F. and can be used efficiently throughout the ranges of temperatures normally encountered in practice.

The amount of chlorinated diphenyloxide isomers employed with the base liquid may be varied through a wide range. Good results have been obtained by employing from 20% by weight to 80% by weight chlorinated diphenyloxide isomers with the base liquid. For most purposes, from about 30% by weight to 70% by weight chlorinated diphenyloxide isomers will be employed with from 70% by weight to 30% by weight of the base liquid comprising ethyl-tetrachlorbenzene isomers and ethyl-pentachlorbenzene in the ratio of about 30:70.

A number of specific mixtures of the dielectric which have been found to be satisfactory are as follows:

| | Per cent by weight |
|---|---|
| Ethyl-tetrachlorbenzene isomers | 21 |
| Ethyl-pentachlorbenzene | 49 |
| Hexachlordiphenyloxide isomers | 30 |

This dielectric mixture has a freezing point of −20° F., a flash point of 355° F., boils at 590° F., and will not burn. The power factor for 60-cycle current and at room temperature is .05%.

| | Per cent by weight |
|---|---|
| Ethyl-tetrachlorbenzene isomers | 9 |
| Ethyl-pentachlorbenzene | 21 |
| Pentachlordiphenyloxide isomers | 70 |

The freezing point of this dielectric mixture is about −20° F. It has a boiling point of 610° F., and a flash point of 370° F., and it will not burn. The power factor for 60-cycle current at room temperature is also about .05%.

| | Per cent by weight |
|---|---|
| Ethyl-tetrachlorbenzene isomers | 49 |
| Ethyl-pentachlorbenzene | 21 |
| Pentachlordiphenyloxide isomers | 30 |

This dielectric mixture has a freezing point in the neighborhood of −35° F., a flash point of 320° F., boils at 550° F., and will not burn. The power factor for 60-cycle current at room temperature is 0.1%.

| | Per cent by weight |
|---|---|
| Ethyl-tetrachlorbenzene isomers | 50 |
| Hexachlordiphenyloxide isomers | 50 |

This dielectric liquid has a freezing point of about −15° F., a flash point of 315° F., boils at 540° F., and will not burn. The power factor for 60-cycle current at room temperature is about 0.1%.

For many purposes, it may be desirable to provide dielectric liquids with a freezing point lower than that which may be obtained by employing the above mixtures of ethyl-tetrachlorbenzene, ethyl-pentachlorbenzene and chlorinated diphenyl. In such cases, liquids which are classed freezing point depressors are added.

Good results have been obtained by adding to the dielectric liquids described hereinbefore 10% to 5% by weight of one or more of aryl-trichlor-tetralin and the chlorinated alkyl derivatives of benzene in which the alkyl side-chain is saturated, or 5% to 40% by weight trichlorbenzene. The chlorinated alkyl derivatives of benzene that have been found to be satisfactory are isopropyl-trichlorbenzene, amyl-pentachlorbenzene, amyl-trichlorbenzene isomers, amyl-tetrachlorbenzene isomers, tertiarybutyl-chlorbenzenes (for example, butyl-trichlorbenzene isomers, butyl-tetrachlorbenzene isomers and butyl-pentachlorbenzene), isopropyl-pentachlorbenzene, isopropyl-tetrachlorbenzene isomers, ethyl-trichlorbenzene isomers and trichlortoluene isomers.

In using the chlorinated alkyl derivatives of benzene where the chlorine is attached to the carbon in the ring, there should not be more than six or seven carbon atoms in the side-chain. If this limit of carbon atoms in the side chain is exceeded, the quantity of the chlorinated alkyl derivatives of benzene added as a freezing point depressor will have to be reduced to compensate for the number of carbon atoms in order to assure the obtaining of a substantially incombustible gas if the dielectric is decomposed by an electric arc. It has been found preferable to work with chlorinated alkyl derivatives of benzene having fewer than six or seven carbon atoms in the side-chain because then it is not necessary to watch with as great care the quantity of the derivatives added.

In this connection, it is preferable to employ ethyl-trichlorbenzene isomers or trichlortoluene isomers since they have a smaller number of carbon atoms in the side-chain. As is well known, ethyl-trichlorbenzene has only two carbon atoms in the side-chain and trichlortoluene has only one. Therefore, these chlorinated derivatives of benzene are highly suitable for use as freezing point depressors.

For some purposes it has been found that trichlorbenzene is not as satisfactory as the other freezing point depressors. Trichlorbenzene is not as stable as some of the other depressors, it increases the power factor more rapidly when used in quantities and will decompose when exposed to light. The chief advantage of this liquid as a freezing point depressor is that a dielectric containing considerable quantities of it may be produced at a lower price than when any of the other depressors are employed. It has been found that from 5% to 40% by weight may be employed. However, it is to be noted that when more than 30% by weight of trichlorbenzene is employed, the power factor increases rapidly, and that when as much as 40% by weight is utilized in the interest of reduction in cost, there is some danger of crystallization at sub-normal temperatures. When crystallization occurs, the cooling effect is lost because of poor circulation.

In employing the freezing point depressors other than trichlorbenzene, good results have been obtained with from 10% to 25% by weight of any one of them, or mixtures of two or more. The particular freezing point depressor or mixtures of them selected will depend on the conditions to be met.

A number of specific mixtures of the dielectric liquid carrying freezing point depressors are as follows:

|  | Per cent by weight |
|---|---|
| Ethyl-tetrachlorbenzene isomers | 16.2 |
| Ethyl-pentachlorbenzene | 37.8 |
| Pentachlordiphenyloxide isomers | 36 |
| Trichlortoluene isomers | 10 |

This dielectric mixture has a freezing point of −20° F., and boils at 580° F. Tests reveal that it has no true flash point, and that it will not burn even at boiling temperatures. The power factor is low, being about 0.4% for 60-cycle current at room temperature.

|  | Per cent by weight |
|---|---|
| Ethyl-tetrachlorbenzene isomers | 13.5 |
| Ethyl-pentachlorbenzene | 31.5 |
| Pentachlordiphenyloxide or hexachlordiphenyloxide isomers | 45 |
| Isopropyl-trichlorbenzene isomers | 10 |

This dielectric gives a freezing point of from −15° to −20° F. A flash point may occur anywhere from 335° to 345° F. It boils around 590° to 600° F., and will not burn at the boiling point. The power factor for 60-cycle current at room temperature is about 0.2%.

|  | Per cent by weight |
|---|---|
| Ethyl-tetrachlorbenzene isomers | 8.1 |
| Ethyl-pentachlorbenezene | 18.9 |
| Pentachlordiphenyloxide or hexachlordiphenyloxide isomers | 63 |
| Trichlortoluene isomers | 10 |

This dielectric gives a freezing point of from −5° to +10° F. It boils at 600° to 610° F., has no true flash point, and will not burn at the boiling point. The power factor for 60-cycle current and at room temperature is about 0.4%.

|  | Per cent by weight |
|---|---|
| Ethyl-tetrachlorbenzene isomers | 18.9 |
| Ethyl-pentachlorbenzene | 44.1 |
| Pentachlordiphenyloxide isomers | 27 |
| Trichlorbenzene isomers | 10 |

This dielectric has a low freezing point which is around −40° F. It boils at 540° F., has a flash point of 320° F., and will not burn at the boiling temperature. The power factor for 60-cycle current at room temperature is 0.4%.

|  | Per cent by weight |
|---|---|
| Pentachlordiphenyloxide or hexachlordiphenyloxide isomers | 24.3 |
| Ethyl-tetrachlorbenzene isomers | 17 |
| Ethyl-pentachlorbenzene | 39.7 |
| Isopropyl-trichlorbenzene isomers | 9 |
| Aryl-trichlortetralin isomers | 10 |

The freezing point of this dielectric mixture is from −20° to −30° F. A flash point occurs at about 310° to 320° F., and it boils at about 560° to 570° F., and will not burn at the boiling temperature. The power factor is about the same as for the previous mixture, being about 0.4% for 60-cycle current at room temperature.

In the chlorination of diphenyloxide isomers, best results will be obtained by introducing from 45% to 65% chlorine by weight. Chlorinated diphenyloxide is also available to the trade at prices which will enable its wide use. Pentachlordiphenyloxide isomers and hexachlordiphenyloxide compounds have been utilized with success.

In view of the many examples of suitable dielectric liquids given hereinbefore, it is believed that the art will be sufficiently instructed as far as the other freezing point depressors are concerned, if we merely give the characteristics of the materials so as to enable their proper selection.

In employing tertiarybutyl-chlorbenzene isomers, mixtures of butyl-trichlorbenzene isomers and butyl-tetrachlorbenzene isomers and butyl-pentachlorbenzene will be utilized. It is found that mixtures having the following characteristics are suitable:

Boiling range, 270° C. to 328° C.
Fire point, 230° C.
Flash point, around 160° C.
Specific gravity, 1.35 at 40° C.
Chlorine content, 45% by weight to 58% by weight.

In utilizing chlorinated isopropylbenzenes, it has been found that suitable isopropyl-pentachlorbenzene should have a boiling range of 308° C. to 310° C., melting point of about 45° C., flash point over 200° C., no fire point, specific gravity 1.43 at 96° C., chlorine content 60.5%.

Isopropyl-tetrachlorbenzene isomers are also suitable. In selecting the isomers they should have the following characteristics:

Boiling range, 270° C. to 290° C.
Melting point, 10° C.
Flash point, 180° C.
No fire point.
Specific gravity, 1.35 at 96° C.
Chlorine content, 55%.

Mixtures of isopropyl-tetrachlorbenzene isomers and isopropyl-pentachlorbenzene have very desirable characteristics as a depressor. These mixtures should have the following characteristics:

Boiling range, 270° C. to 310° C.
Melting point, 45° C.
Flash point, over 200° C.
No fire point.
Specific gravity, 1.37 at 96° C.
Chlorine content, 57.2%.

Isopropyl-trichlorbenzene isomers employed as a depressor should have the following characteristics:

Boiling range, 250° C. to 253° C.
Melting point, below 40° C.
Flash point, 116° C.
Fire point, 140° C.
Specific gravity, 1.3 at 30° C.
Chlorine content, about 48%.

Another freezing point depressor that has been used with success is amyl-pentachlorbenzene. In using this material it should have the following characteristics:

Boiling range, 165° C. to 185° C. at 10 millimeters pressure.
Melting point, below 0° C.
Flash point, 190° C.
Fire point, over 200° C.
Specific gravity, 1.4 at 20° C.

Amyl-trichlorbenzene and amyl-tetrachlorbenzene isomers make a suitable mixture. In selecting mixtures of these materials, the following characteristics should be observed:

Boiling range, 270° C. to 298° C.
Melting point, below 0° C.
Flash point, about 130° C.
Fire point, 168° C.
Specific gravity, 1.252 at 24° C.
Chlorine content, about 42.2%.

Ethyl-trichlorbenzene isomers have been found suitable when they have the following characteristics:

Boiling range, 240° C. to 250° C.
Melting point, below 40° C.
Flash point, 123° C.
Fire point, 149° C.
Density, 1.34 at 30° C.
Chlorine content, about 51%.

Toluene derivatives have been found suitable as freezing point depressors, trichlortoluene isomers having been found the more satisfactory. In selecting the isomeric mixtures the following characteristics are desirable:

Boiling range, 225° C. to 250° C.
Melting point, 35° C.
No flash point.
Specific gravity, 1.572 at 30° C.
Chlorine content, about 54.6%.

Tetrachlortoluene isomers and pentachlortoluene have also been found to be useful as freezing point depressors.

It will be obvious to those experienced in the art that in using many of the hereinbefore identified freezing point depressors, particularly those that may be classed the lower chlorinated derivatives of isopropylbenzenes, butylbenzenes and amylbenzenes, care must be taken in blending with the base materials such as mixtures of ethyl-tetrachlorbenzene and ethyl-pentachlorbenzene, or of these materials mixed with chlorinated diphenyloxide, to obtain a fire-proof dielectric. In other words, the chlorine content of the final dielectric mixture should be 50% or over and the constituents should be so selected that the partial pressures shall be such that the vapors given off on heating will not support combustion or be substantially incombustible.

Tests made on our preferred dielectric liquid reveal that it is non-inflammable and when decomposed electrically evolves incombustible gases. It will not be attempted to explain why all the ingredients individually give off substantially incombustible gases when decomposed, since they do not all follow the same rule. It will be observed that in the formula for ethyl-tetrachlorbenzene, hydrogen is present in excess of the chlorine. Nevertheless, when decomposed electrically, the gases given off are substantially incombustible. The dielectric liquid, comprising ethyl-tetrachlorbenzene, ethyl-pentachlorbenzene, chlorinated diphenyloxide and one or more of the freezing point depressors, is non-inflammable and the gases given off on electric decomposition incombustible.

Figure 6:
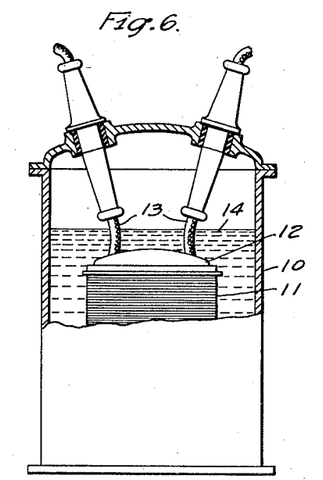
Fig. 6 is a view partly in side elevation and partly in section showing the manner in which the coils and core of a transformer are immersed in the dielectric liquid.

Referring to Fig. 6 of the drawings, a transformer casing or tank 10 is shown with a core 11 carrying coils 12, all arranged in accordance with standard practice. The coils 12 are provided with terminal conductors 13. As illustrated, the casing contains a sufficient amount of the dielectric liquid 14 to completely immerse the coils 12.

In transformers, the dielectric liquid is used primarily for maintaining the proper temperature and insulation. In the interest of economy in the dielectric liquid, only a small amount will be employed, and in order for it to effect the proper heat transfer, provision will be made for circulating it through cooling coils in a manner well known in the art, since it has been employed for years in the oil cooling of transformers. When a dielectric liquid of this kind is employed, and a disturbance occurs in the electrical system resulting in arcing of the transformer, there is no fire hazard since the dielectric liquid will not be burned, and the gases which are given off are incombustible and will smother the arc.

With the advent of non-inflammable dielectric liquids, which when decomposed give off incombustible gases, the trade demanded that capacitors, cables and other similar electrical apparatus be made fire-proof. This involves the fire-proofing of the insulating materials employed in building such apparatus.

Figure 7:
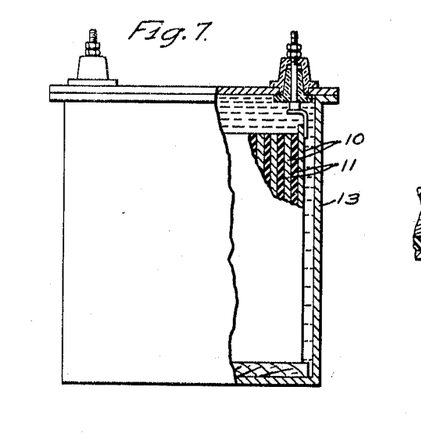
Fig. 7 is a view in side elevation of a capacitor built in accordance with this invention and having parts broken away showing details of the construction.

In the construction of capacitors, the plates 10 made of some suitable conducting material, such as aluminum foil and the like, are separated by sheets 11 of insulation or dielectric material. Paper is the material most generally used as a dielectric or insulation between the plates.

In the present invention, the capacitors are fire-proofed by treating the paper with a dielectric liquid which is non-inflammable and which, when decomposed, gives off a substantially incombustible gas. The problem of fire-proofing cables and other similar electrical apparatus is substantially the same as that of fire-proofing capacitors.

Figure 8:
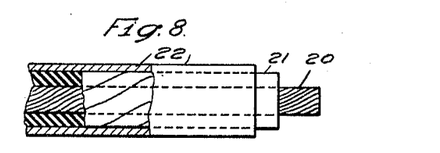
Fig. 8 is a view in side elevation of a section of cable constructed in accordance with this invention and having parts broken away to show details of the structure.

Referring to Fig. 8, in the manufacture of cables a conductor 20 has applied thereto some suitable insulating material 21, such as a paper wrapping. A lead sheath 22 may be applied for protecting the insulation. Other wrappings may be applied to the cable in accordance with general practice, and will not be described herein since such practice is well known to the art.

If the paper insulation employed in cables which is the equivalent of the paper dielectric in capacitors, is not fire-proofed and an arc is caused by some disturbance in the electrical system in which the cable may be connected, a portion of the cable is likely to be destroyed causing an interruption in operation.

In the present invention, the paper insulation or dielectric employed in both capacitors and cables is fire-proofed by treating it with a liquid dielectric comprising ethyl-tetrachlorbenzene, ethyl-pentachlorbenzene and chlorinated diphenyloxide. The proportions of the ingredients will vary with the conditions to which the electrical apparatus may be subjected.

The ratio of ethyl-tetrachlorbenzene and ethyl-pentachlorbenzene may be varied widely. The percentages of each will depend on the application to be made. Mixtures comprising from 20% to 80% by weight ethyl-pentachlorbenzene and 80% to 20% by weight ethyl-tetrachlorbenzene isomers have been found satisfactory because of their good electrical characteristics, either alone or as a mixture.

When the chlorinated diphenyloxide is added to a preferred base dielectric liquid comprising about 30% by weight ethyl-tetrachlorbenzene isomers and about 70% by weight ethyl-pentachlorbenzene, the freezing point of the dielectric liquid is lowered to a temperature well below that of either alone. Further, since all the ingredients have good electrical characteristics, the resultant dielectric liquid will also have good electrical characteristics. The ingredients of this dielectric liquid are each non-inflammable and when combined, are non-inflammable. Further, the dielectric liquid when decomposed electrically gives off substantially incombustible gases.

In manufacturing capacitors or cables in the treating of the insulation, that is, the paper or similar material disposed between the plates in the case of capacitors, or the wrapping of insulation on the conductor in the case of cables, all the air is pumped out of the insulation to be treated and the dielectric liquid permitted to penetrate the insulating material under vacuum. In the case of capacitors, when the insulation or paper disposed between the plates has been sufficiently treated, the capacitor case 13 is sealed. This impregnating process is well known in the art and will not be described in greater detail.

Figure 9:
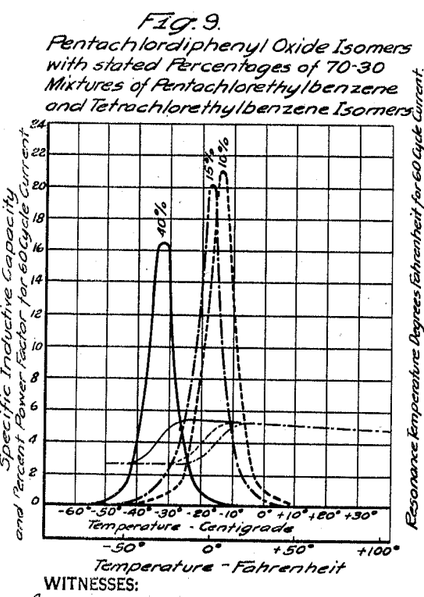
Fig. 9 is a graph showing the specific inductive capacity and percentage power factor for 60-cycle current plotted on temperature in both degrees centigrade and degrees Fahrenheit, for different dielectric mixtures, such as may be employed in the construction of the electrical apparatus in accordance with the teaching of this invention.

The desirable characteristics of our dielectric in capacitors may best be understood by reference to Fig. 9, which gives the power factor of the dielectric employed at different temperatures for different percentages of the ingredients. When a capacitor is treated with a dielectric liquid comprising about 40% by weight of the base liquid comprising ethyl-tetrachlorbenzene and ethyl-pentachlorbenzene in the ratio 30 to 70, and about 60% by weight of an isomeric mixture of hexachlordiphenyloxide compounds, the highest power factor value is reached when the temperature falls to about −15° F. An isomeric mixture of hexachlordiphenyloxide is employed because of its low power factor and fire resisting characteristics.

Investigation of the dielectric liquid reveals that an increase in the amount of ethyl-tetrachlorbenzene isomers and ethyl-pentachlorbenzene in the ratio of 30 to 70 respectively, with chlorinated diphenyloxide isomers lowers the temperature at which a change in the specific inductive capacity of any appreciable amount occurs. This is generally described in engineering terms as lowering the resonance point or temperature. It has also been found that the substitution of pentachlordiphenyloxide for hexachlordiphenyloxide further lowers the resonance point of the capacitor.

As is well known, the specific inductive capacity of the capacitor does not begin to fall off appreciably until the power factor rises to its peak. Therefore, the capacity of a capacitor impregnated with 40% by weight of a base liquid comprising 30% by weight ethyl-tetrachlorbenzene isomers and 70% by weight ethyl-pentachlorbenzene and 60% by weight of an isomeric mixture of hexachlordiphenyloxide, does not begin to decrease until the temperature falls to about −15° F. This is of considerable value in many applications of such apparatus. When capacitors impregnated with our dielectric are connected into electrical systems which are exposed to atmospheric temperatures, the system is not thrown out of resonance with ordinary temperatures, but will continue to function at full rated capacity until the temperature falls to about −15° F. Such temperatures are seldom imposed on capacitors.

Capacitors manufactured in accordance with the teachings of this invention may be utilized to advantage in many different kinds of electrical systems. Since the specific inductive capacity of our present capacitor does not begin to decrease until it reaches the temperature of about −15° F., it may be used to advantage in such electrical systems as railway signalling systems. In such an application, ordinary winter temperatures will not change substantially the capacity of the capacitors and the resonance of the signalling circuits will be maintained even if the temperature drops close to −15° F.

Figure 5:
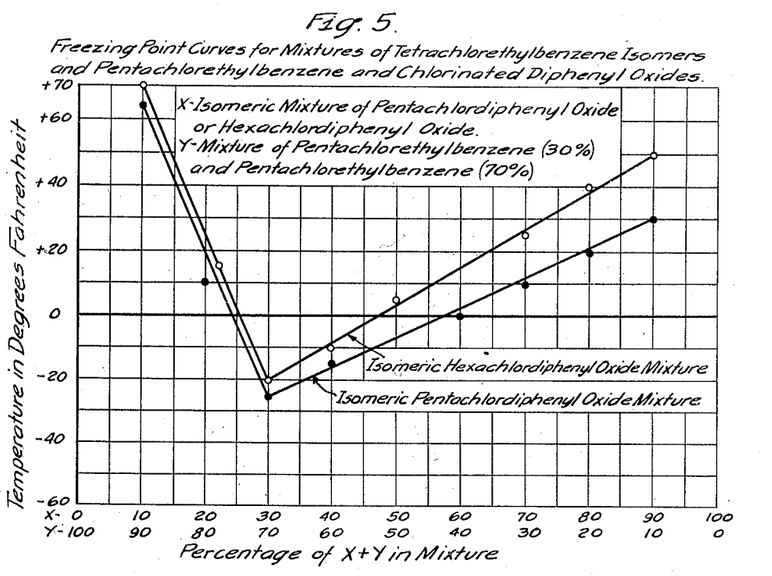
Fig. 5 is a graph showing how the freezing point of the dielectric liquid changes as the percentages of the ingredients are varied.

Referring to Fig. 5, the curve 23 which was plotted from test results obtained on a dielectric mixture containing about 40% by weight ethyl-tetrachlorbenzene isomers and ethyl-pentachlorbenzene in the ratio 30 to 70, and about 60% by weight of chlorinated diphenyloxide, reveals that the power factor of the dielectric liquid for 60-cycle current is approximately .02% for a temperature range of from 100° to 0° F. The specific inductive capacity continually increases from about 200° F. to approximately −15° F. The change of the specific inductive capacity in this range of temperatures is very small, varying from about 4.2 to 5.6. The capacity of the capacitors at the different temperatures varies directly with the specific inductive capacity. Therefore, under this wide range of temperatures from 200° F. to −15° F., the capacity of the condenser varies very little and it will not throw an electric circuit in which it may be connected, out of resonance and cause it to fail.

Figure 10:
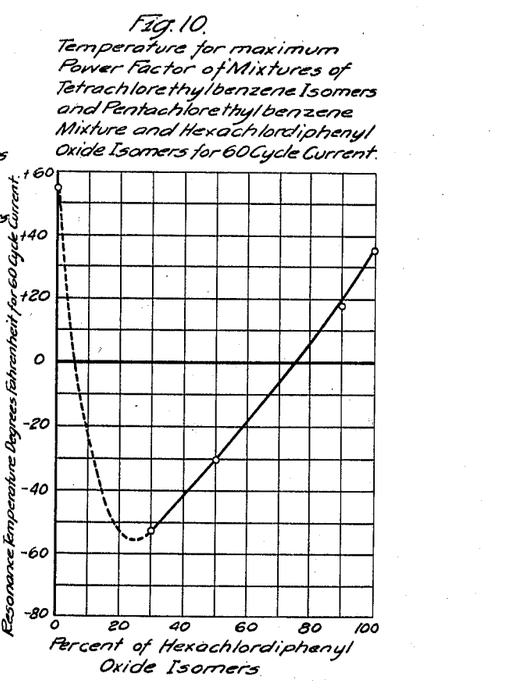
Fig. 10 is a graph showing the 60-cycle resonance temperature of mixtures of ethyl-tetrachlorbenzene isomers, ethyl-pentachlorbenzenes and hexachlordiphenyloxide isomers.

By reference to Figs. 5 and 10, it will be seen that a definite relation exists between freezing point and resonance temperatures. These curves show that by proper selection of the percentages of the ingredients of our dielectric liquid a capacitor having a resonance temperature as low as −55° F. may be produced. For example, a mixture comprising 9% by weight ethyl-tetrachlorbenzene isomers, 21% by weight ethyl-pentachlorbenzene and 70% by weight pentachlordiphenyloxide isomers has an apparent freezing point of −25° F. and a resonance point of about −55° F.

Referring to Fig. 1, it will be observed that as the proportion of ethyl-tetrachlorbenzene isomers is increased in the base mixture of ethyl-tetrachlorbenzene isomers and ethyl-pentachlorbenzene, the freezing point is decreased. Therefore, by changing the composition of our base liquid it is possible to alter the freezing and resonance points of resulting mixtures to suit the application to be made. This gives considerable flexibility in making our dielectric and, if necessary, mixtures can be made which will have resonance temperatures as low as −80° F. However, in the interest of manufacturing economy and low power factor of resulting capacitors, a base liquid comprising 20% to 50% by weight ethyl-tetrachlorbenzene isomers is preferred.

In the case of cables, changes in the specific inductive capacity are not of any great importance. However, the dielectric liquid, because of its ability to withstand low and high temperatures without undergoing any noticeable change in dielectric strength and power factor, is highly desirable. The dielectric liquid, if subjected to an arc, gives off substantially incombustible gases and prevents the occurrence of fires or the like when the cable is employed in buildings, tunnels, and basements. The dielectric liquid employed may be varied within considerable ranges. It has been found that dielectric liquids comprising from 20% to 80% by weight ethyl-tetrachlorbenzene and ethyl-pentachlorbenzene mixed in the ratio of from about 30 to 70 with 70 to 30, respectively, and from 80% to 20% by weight chlorinated diphenyloxide, give good results in both capacitors and cables.

A number of specific examples of the dielectric liquid that may be employed in the manufacture of capacitors and cables and other similar electrical apparatus are as follows:

| | Per cent by weight |
|---|---|
| Ethyl-tetrachlorbenzene isomers | 21 |
| Ethyl-pentachlorbenzene | 49 |
| Hexachlordiphenyloxide isomers | 30 |

This dielectric liquid has a freezing point of −25° F., a flash point of −355° F., boils at 590° F., but will not burn. The power factor for 60-cycle current at room temperature is about .03% and the resonance temperature −55° F. It will, therefore, be evident that a capacitor impregnated with this dielectric liquid may be utilized successfully in electrical systems exposed to very low temperatures.

| | Per cent by weight |
|---|---|
| Ethyl-tetrachlorbenzene isomers | 15 |
| Ethyl-pentachlorbenzene | 35 |
| Pentachlordiphenyloxide isomers or hexachlordiphenyloxide isomers | 50 |

This dielectric liquid freezes somewhere between +5° to −5° F. The flash point is in the neighborhood of 350° F., and it boils between 610° and 615° F., but will not burn. When tested with 60-cycle current at room temperature, it had a power factor of .02. The resonance temperature varies from −30° to −40° F. While this dielectric mixture does not have as low a resonance temperature as the first specific example given, it is suitable for impregnating capacitors and other apparatus for use in systems exposed to low temperatures.

| | Per cent by weight |
|---|---|
| Ethyl-tetrachlorbenzene isomers | 18 |
| Ethyl-pentachlorbenzene | 42 |
| Pentachlordiphenyloxide isomers or hexachlordiphenyloxide isomers | 40 |

The freezing point of this dielectric liquid ranges from −10° to −15° F., and has a flash point of 355° F., boils at 600° to 610° F., but will not burn. The power factor for 60-cycle current at room temperature is .03% and the resonance temperature is from −40° to −45° F.

| | Per cent by weight |
|---|---|
| Ethyl-tetrachlorbenzene isomers | 8 |
| Ethyl-pentachlorbenzene | 32 |
| Pentachlordiphenyloxide isomers or hexachlordiphenyloxide isomers | 60 |

The freezing point of this dielectric mixture is somewhat higher than the previous specific mixtures given, but it may be used successfully at temperatures ranging from −20° to −30° F., which is its resonance temperature. It freezes at from 5° to 15° F., has a flash point at 360° F., boils at 615° to 620° F., but will not burn. The power factor for 60-cycle current at room temperature is .02%.

| | Per cent by weight |
|---|---|
| Ethyl-tetrachlorbenzene isomers | 35 |
| Ethyl-pentachlorbenzene | 15 |
| Pentachlordiphenyloxide isomers or hexachlordiphenyloxide isomers | 50 |

The freezing point of this mixture ranges from −10° to −15° F. It boils at about 545° F., has a flash point between 310° and 315° F., but will not burn. The power factor for 60-cycle current at room temperature is about .07%, which is a little higher than that of the other specific mixtures. The resonance temperature is quite low, ranging from about −50° to −60° F.

| | Per cent by weight |
|---|---|
| Ethyl-tetrachlorbenzene isomers | 50 |
| Pentachlordiphenyloxide isomers or hexachlordiphenyloxide isomers | 50 |

This dielectric liquid will stand very low temperatures. Its freezing point ranges from about −20° to −25° F., and has a resonance temperature of −60° to −70° F. The boiling point is around 540° to 545° F. The flash point of the dielectric is around 310° to 315° F., but it has no fire point. The power factor for 60-cycle current at room temperature is about .1%.

When the term "substantially incombustible" is used in this application, we mean that when our dielectric liquid is employed in electrical apparatus and is decomposed electrically by an arc and the gases of decomposition mixed with air, generally, they will not burn but if they are ignited at a point of high temperature, flame propogation will be very slow and will not result in detonation because the major volume of the gas will not support combustion.

In this specification, the term "aryl-trichlortetralin" is employed to designate that three chlorine atoms are bonded to the carbon atoms in the ring structure.

Since certain changes may be made in the above construction and different embodiments of the invention could be made without departing from the scope thereof, it is intended that all matter contained in the above description or shown in the accompanying drawings shall be interpreted as illustrative and not in a limiting sense.

We claim as our invention:

1. A dielectric liquid for electrical apparatus comprising ethyl-tetrachlorbenzene, ethyl-pentachlorbenzene and chlorinated diphenyloxide.

2. A dielectric liquid for electrical apparatus comprising ethyl-tetrachlorbenzene, chlorinated diphenyloxide and 10% to 25% by weight of a soluble organic dielectric material for lowering the freezing point of the dielectric liquid.

3. A dielectric liquid for electrical apparatus comprising ethyl-tetrachlorbenzene, ethyl-pentachlorbenzene, chlorinated diphenyloxide and as a freezing point depressor isopropyl-trichlorbenzene.

4. A dielectric liquid for electrical apparatus comprising ethyl-tetrachlorbenzene, ethyl-pentachlorbenzene, chlorinated diphenyloxide and a mixture of isopropyl-trichlorbenzene and aryl-trichlortetralin, the isopropyl-trichlorbenzene and aryl-trichlortetralin being employed to lower the freezing point of the dielectric liquid.

5. A dielectric liquid for electrical apparatus comprising from 20% to 80% by weight ethyl-tetrachlorbenzene and ethyl-pentachlorbenzene and from 80% to 20% by weight chlorinated diphenyloxide.

6. A dielectric liquid for electrical apparatus consisting of from 20% to 80% by weight ethyl-tetrachlorbenzene and ethyl-pentachlorbenzene, from 80% to 20% by weight chlorinated diphenyloxide, and as a freezing point depressor isopropyl-trichlorbenzene in amounts varying from 10% to 25% by weight.

7. A dielectric liquid for electrical apparatus consisting of from 20% to 80% by weight ethyl-tetrachlorbenzene and ethyl-pentachlorbenzene, from 80% to 20% by weight chlorinated diphenyloxide, and as a freezing point depressor trichlor-tetralin varying from 10% to 25% by weight.

8. A dielectric liquid for electrical apparatus comprising from 40% to 60% by weight ethyl-tetrachlorbenzene and ethyl-pentachlorbenzene, the ethyl-tetrachlorbenzene and ethyl-pentachlorbenzene being in the ratio of 20 to 80, and 60% to 40% by weight chlorinated diphenyloxide.

9. A liquid dielectric comprising, in combination, 40% to 60% by weight ethyl-tetrachlorbenzene and ethyl-pentachlorbenzene, the ethyl-tetrachlorbenzene and ethyl-pentachlorbenzene being in the ratio of 20 to 80, 40% to 60% by weight chlorinated diphenyloxide, and isopropyl-trichlorbenzene in amounts from 10% to 25% by weight.

10. A dielectric liquid for electrical apparatus comprising ethyl-tetrachlorbenzene and chlorinated diphenyloxide.

11. A dielectric liquid for electrical apparatus comprising ethyl-pentachlorbenzene and chlorinated diphenyloxide.

12. A dielectric liquid for electrical apparatus comprising ethyl-pentachlorbenzene, chlorinated diphenyloxide and 10% to 25% by weight of a soluble organic dielectric material for lowering the freezing point.

13. A dielectric liquid for electrical apparatus comprising 40% to 60% by weight ethyl-tetrachlorbenzene and ethyl-pentachlorbenzene being in the ratio of 80 to 20 and 60% to 40% by weight of chlorinated diphenyloxide.

14. The method of protecting electrical apparatus provided with an electrical conductor and a casing which comprises interposing between the conductor and casing a dielectric liquid which comprises ethyl-tetrachlorbenzene, ethyl-pentachlorbenzene and chlorinated diphenyloxide which materials when decomposed by an electric arc generate substantially incombustible gases.

15. The method of protecting electrical apparatus provided with a conductor and casing which comprises interposing between the conductor and casing a dielectric liquid comprising ethyl-tetrachlorbenzene, ethyl-pentachlorbenzene, chlorinated diphenyloxide, and at least one of the freezing point depressors of the group consisting of trichlortoluene, trichlorbenzene, isopropyl-trichlorbenzene and aryltrichlortetralin, the dielectric materials when decomposed electrically generating substantially incombustible gases.

16. A dielectric liquid for electrical apparatus comprising ethyl-tetrachlorbenzene, ethyl-pentachlorbenzene, chlorinated diphenyloxide and at least one of the freezing point depressors of the group consisting of isopropyl-trichlorbenzene, aryltrichlortetralin, trichlortoluene and trichlorbenzene.

17. The method of protecting electrical apparatus provided with a conductor and casing which comprises interposing between the conductor and casing a dielectric liquid comprising 30% to 60% by weight of a mixture of ethyl-tetrachlorbenzene and ethyl-pentachlorbenzene, the mixture consisting of from 20% to 80% by weight ethyl-tetrachlorbenzene and 80% to 20% by weight ethyl-pentachlorbenzene, 60% to 25% by weight chlorinated diphenyloxide and at least one of the freezing point depressors of the group consisting of isopropyl-trichlorbenzene and aryltrichlortetralin, trichlortoluene and trichlorbenzene.

18. A dielectric liquid for electrical apparatus comprising 30% to 60% by weight of a mixture of ethyl-tetrachlorbenzene and ethyl-pentachlorbenzene, said mixture comprising 20% to 80% by weight ethyl-tetrachlorbenzene and 80% to 20% by weight ethyl-pentachlorbenzene, 60% to 25% by weight chlorinated diphenyloxide and the remainder trichlorbenzene for lowering the freezing point, the dielectric materials when decomposed electrically generating substantially incombustible gases.

19. A method of insulating a conductor, the different parts of which when energized have different potentials causing an electrostatic field which comprises applying a solid material to the conductor and treating the solid material with a mixture of ethyl-tetrachlorbenzene, ethyl-pentachlorbenzene and chlorinated diphenyloxide.

20. The method of insulating a conductor, the different parts of which when energized have different potentials causing an electrostatic field which comprises applying an absorbent material to the conductor and treating the solid material with a mixture of ethyl-tetrachlorbenzene, ethyl-pentachlorbenzene and chlorinated diphenyloxide.

21. The method of insulating a conductor, the different parts of which when energized have different potentials causing an electrostatic field which comprises applying a paper to the conductor and treating the paper with a liquid mixture comprising ethyl-tetrachlorbenzene, ethyl-pentachlorbenzene and chlorinated diphenyloxide.

22. The method of insulating a cable provided with a conductor and a solid insulating material, the different parts of the conductor when energized having different potentials causing an electrostatic field which comprises treating the solid insulating material with a mixture of 20% to 80% by weight of a mixture of ethyl-tetrachlorbenzene, ethyl-pentachlorbenzene and 80% to 20% by weight chlorinated diphenyloxide.

23. The method of insulating a capacitor provided with a plurality of spaced conductors which when energized have different potentials causing an electrostatic field which comprises interposing between said conductors a mixture of ethyl-tetrachlorbenzene, ethyl-pentachlorbenzene and chlorinated diphenyloxide.

24. The method of insulating a capacitor provided with a plurality of conductors which when energized have different potentials and which are separated by a solid dielectric which comprises treating the solid dielectric with a mixture of ethyl-tetrachlorbenzene, ethyl-pentachlorbenzene and chlorinated diphenyloxide.

25. The method of insulating a plurality of conductors which when energized have different potentials causing an electrostatic field which comprises interposing between the conductors a porous paper and treating the porous paper with a mixture of 20% to 80% by weight ethyl-tetrachlorbenzene and 80% to 20% by weight chlorinated diphenyloxide.

26. The method of insulating a condenser provided with a plurality of conductors spaced apart and having interposed therebetween a solid porous dielectric, the conductors being disposed to have when energized different potentials causing an electrostatic field, treating the solid porous dielectric with a mixture of 20% to 80% by weight ethyl-tetrachlorbenzene and ethyl-pentachlorbenzene, the mixture consisting of 20% to 80% by weight of ethyl-tetrachlorbenzene and 80% to 20% by weight of ethyl-pentachlorbenzene and chlorinated diphenyloxide.

27. A dielectric liquid for electrical apparatus comprising a saturated nuclear chlorinated lower alkyl derivative of benzene, chlorinated diphenyloxide and at least one of the freezing point depressors of the group consisting of trichlorbenzene, aryltrichlortetralin, isopropyltrichlorbenzene and trichlortoluene.

28. The method of insulating a conductor from a casing which comprises interposing a dielectric material between the conductor and casing, the dielectric material comprising a saturated nuclear chlorinated lower alkyl derivative of benzene, chlorinated diphenyloxide and at least one of the group of freezing point depressors, trichlorbenzene, trichlortoluene, isopropyl-trichlorbenzene and aryltrichlortetralin.

29. A dielectric liquid for electrical apparatus comprising, in combination, a nuclear chlorinated mono-alkyl derivative of benzene containing not more than 7 carbon atoms in the saturated alkyl side-chain and chlorinated diphenyl oxide.

30. A dielectric liquid for electrical apparatus comprising, in combination, a nuclear chlorinated mono-alkyl derivative of benzene containing not more than 7 carbon atoms in a saturated alkyl side-chain, chlorinated diphenyl oxide and at least one of the group of freezing point depressors consisting of trichlorbenzene, isopropyltrichlorbenzene, trichlortoluene and aryltrichlortetralin.

31. The method of insulating a conductor from a casing which comprises interposing a dielectric material between the conductor and casing, the dielectric material comprising a nuclear chlorinated mono-alkyl derivative of benzene containing not more than 7 carbon atoms in the alkyl side-chain and chlorinated diphenyl oxide.

32. The method of insulating a conductor from a casing which comprises interposing a dielectric material comprising a nuclear chlorinated mono-alkyl derivative of benzene containing not more than 7 carbon atoms in the alkyl side-chain, chlorinated diphenyl oxide, and at least one of the group of freezing point depressors consisting of trichlorbenzene, isopropyl-trichlorbenzene, trichlortoluene and aryltrichlortetralin.

JAMES G. FORD.
CHARLES F. HILL.